June 17, 1930.   J. L. SCHWARTZ   1,764,987
POCKET THERMOMETER
Filed July 21, 1928
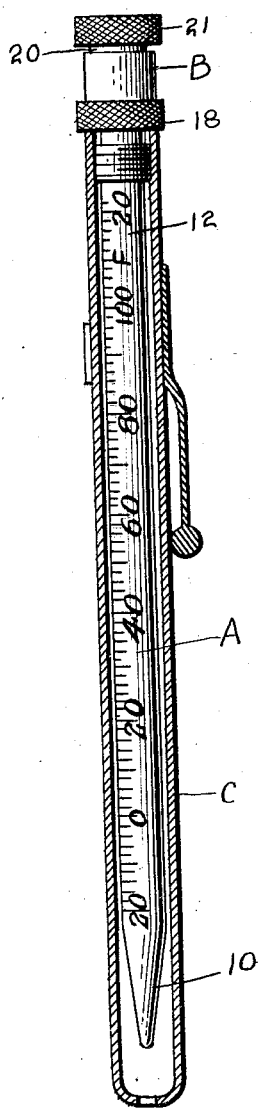
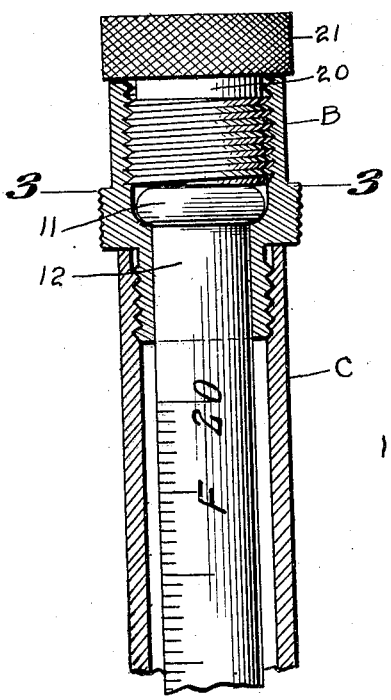
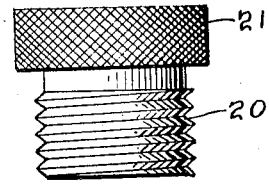
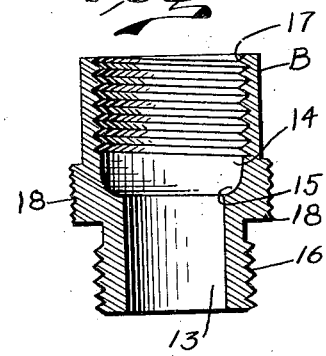
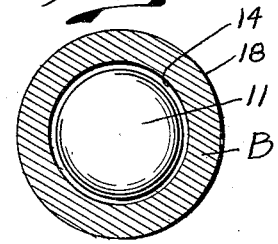
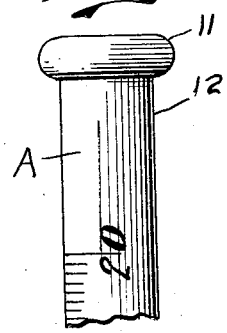
INVENTOR.
JOHN LEONARD SCHWARTZ
BY Frank H. Borden
ATTORNEY.

Patented June 17, 1930

1,764,987

UNITED STATES PATENT OFFICE

JOHN LEONARD SCHWARTZ, OF PHILADELPHIA, PENNSYLVANIA, ASSIGNOR TO PHILADELPHIA THERMOMETER CO., OF PHILADELPHIA, PENNSYLVANIA, A CO-PARTNERSHIP COMPOSED OF JOHN LEONARD SCHWARTZ, GEORGE W. ROSSMAN, AND CLARENCE A. ROSSMAN

POCKET THERMOMETER

Application filed July 21, 1928. Serial No. 294,381.

This invention relates to pocket thermometers.

Among the objects of the invention are: to improve the construction of pocket thermometers; to provide a thermometer with a casing to guard the glass against breakage; to provide a thermometer with a casing, a portion of which is arranged for engagement by the fingers of an operator to provide a handle for the thermometer; to provide a thermometer with a handle by which the thermometer may be manipulated without slipping from the grasp of the operator; to provide a pocket thermometer of such construction that the thermometer element may be easily and quickly replaced in a handle in the event of breakage; to provide a pocket thermometer of such construction that a removable thermometer element is held in a braced and strengthened position relative the remainder of the unit; and many other objects and advantages as will be more apparent as the description proceeds.

Although of course susceptible to ordinary thermometer uses, the invention is of particularly advantageous use in determining the temperatures of articles which provide appreciable resistance to the insertion of a thermometer, or to its withdrawal after insertion. Such uses, for instance as testing meats or vegetables, when appreciable strain is applied to the thermometer in order to insert it far enough into the article as to note the internal temperature thereof. It is thus of peculiar importance to those who make inspections of freight or express shipments. In such services the normal life of a thermometer is not usually of great length, and it is desirable to provide a support or casing in which a refill or thermometer element may be quickly and easily inserted by the operator.

In the accompanying drawings:

Fig. 1, represents a longitudinal section through a pocket thermometer according to this invention, with the thermometer and its handle shown in elevation, Fig. 2, represents a section through the improved handle and the upper part of the guard or casing, with the thermometer element and the retaining cap shown in elevation, Fig. 3, represents a transverse section taken on line 3—3 of Fig. 1, Fig. 4, represents an elevation of the retaining plug on an enlarged scale, Fig. 5, represents a section through the ferrule or handle of the device, on an enlarged scale, and Fig. 6, represents a fragmentary elevation of the thermometer element.

The pocket thermometer comprises a thermometer A, handle B, and casing or housing C. The thermometer is preferably more or less sharply pointed at one end, as at 10, and at its upper end is provided with an enlarged or flanged bead or head 11 formed on the end of shank 12. It will be understood that the bulb of the thermometer is in the pointed end 10.

The handle B comprises an open ended tubular member, having a lower constricted bore 13, merging into a larger bore 14, at the shoulder 15. The material forming the bore 13 is externally threaded as at 16, whereas the larger upper bore 14 is internally threaded as at 17 from the open mouth to a point just above the shoulder 15. The lower external thread 16 is terminated just short of the flange or shoulder 18, the periphery of which is knurled or similarly treated to form a non-slipping surface, spaced from the smaller diameter of the main barrel of the handle externally of threads 17.

The handle is completed by a threaded plug 20 arranged for threaded engagement with the bore 14 of the tubular member, and having a knurled flange 21 of substantially the same diameter as the flange 18.

The thermometer element A is inserted point first through the handle part as shown in Fig. 5, and the arrangement is such that the bore 13 has a mere sliding engagement with the shank 12 of the element, so that when the bead or head of the element impinges against the shoulder 15 of the handle, the shank immediately adjacent the head is held against rocking movement by the bore 13. In order to hold the enlarged bead or head of the element against the shoulder 15, the plug 20 is screwed into the upper end of the bore 14, engaging threads 17, and bearing against the end of the thermometer element. With this rigid assembly thus provided the thermometer element is reinforced by the sides of the bore 13, while being firmly held against axial movement between the end of plug 20 and shoulder 15. It is to be noted that this lateral reinforcement effected by the bore 13 is to a point well below the external knurled shoulder 18.

To the thermometer unit thus effected, the casing C, having the upper internal threads 22, and lower drain opening 23, may be screwed to form a guard for the thermometer in the pocket of the user or operator. A clip 24 may be provided for attaching the unit to the pocket of the user.

The thermometer units used, being of glass, are frangible and are frequently broken from shocks, etc., and in the past it was necessary to send the entire instrument to a properly fitted shop for repairs. With the invention herein, it is but necessary to secure a new thermometer unit, which is readily inserted upon removing the plug 20, as will be obvious.

It is of importance to note the positive and firm grip or grasp that is effected by the formation of handle discussed. The handle, in assembled and usable form, comprises a relatively smooth barrel, having at each end raised knurling. As thermometers of this class are frequently used on slippery meats and fruits, etc., from time to time the handle becomes so slippery as to cause the fingers to slide off the handle, (in the normal case), with resultant breakage of the thermometer, either from dropping the instrument, or from applying the strain laterally on the frangible glass. In the instant invention, however, the fingers simply engage the shoulders either in forcing the thermometer in, or in pulling it out, and the knurling is sufficient to prevent such sliding as has been noted. It is of importance also to note the ornamental effect presented by the construction disclosed. It more closely resembles a pencil in its visual aspect than has heretofore been possible, while at the same time affording the more important results of instant disassembly, and reinforcement of the glass of the thermometer.

It is pointed out that the casing as disclosed provides adequate guarding for the instrument in the pocket of the user, although in spaced relation to the glass for its full length, while enabling the proper strong grip on the glass when the guard is removed for the normal use of the device.

I claim as my invention:

A pocket thermometer comprising an open ended hollow body, the body having a lower restricted internal bore and a larger threaded upper bore, and having a curved shoulder at the junction of the two bores, the body being externally threaded at the lower end, a glass thermometer having a shank of such diameter as to slide within the lower restricted bore, and having a beaded or curved flange arranged to seat directly upon said curved shoulder, a plug threadedly engageable in the upper larger bore and arranged to abut the head or flange of the thermometer over substantially its entire area to compress the flange between the plug and the shoulder, raised knurling formed on the body at substantially the level of the flange of the thermometer, raised knurling formed on the plug, the knurlings and the body forming a non-slip handle for the unit, and a casing threaded upon the threads of the lower end of the body the engagement of the plug against the thermometer end being such as to rigidly and immovably hold the thermometer in the body.

In testimony whereof I affix my signature.

JOHN LEONARD SCHWARTZ.